(12) United States Patent
Zhou

(10) Patent No.: US 10,783,590 B1
(45) Date of Patent: Sep. 22, 2020

(54) MUTUAL AID NETWORK BASED ON SMART CONTRACT AND BLOCKCHAIN

(71) Applicant: Alibaba Group Holding Limited, George Town (KY)

(72) Inventor: Fan Zhou, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/713,446

(22) Filed: Dec. 13, 2019

Related U.S. Application Data

(63) Continuation of application No. PCT/CN2019/094546, filed on Jul. 3, 2019.

(51) Int. Cl.
| | | |
|---|---|---|
| G06Q 40/00 | (2012.01) | |
| G06Q 40/08 | (2012.01) | |
| G06Q 20/08 | (2012.01) | |
| G06Q 20/36 | (2012.01) | |
| H04L 9/06 | (2006.01) | |

(52) U.S. Cl.
CPC .......... *G06Q 40/08* (2013.01); *G06Q 20/085* (2013.01); *G06Q 20/3678* (2013.01); *H04L 9/0637* (2013.01)

(58) Field of Classification Search
CPC ..................................................... G06Q 40/00
USPC ............................................................. 705/4
See application file for complete search history.

(56) References Cited

U.S. PATENT DOCUMENTS

2019/0236598 A1* 8/2019 Padmanabhan .... G06Q 20/4016

FOREIGN PATENT DOCUMENTS

| | | |
|---|---|---|
| CN | 107808345 | 3/2018 |
| CN | 108833110 | 11/2018 |
| CN | 108921694 | 11/2018 |
| CN | 109299053 | 2/2019 |
| CO | 109191315 | 1/2019 |
| EP | 3388994 | 10/2018 |

(Continued)

OTHER PUBLICATIONS

PCT International Search Report and Written Opinion in International Application No. PCT/CN2019/094546, dated Mar. 19, 2020, 9 pages.

(Continued)

*Primary Examiner* — Ojo O Oyebisi
(74) *Attorney, Agent, or Firm* — Fish & Richardson P.C.

(57) ABSTRACT

Disclosed herein are methods, systems, and apparatus, including computer programs encoded on computer storage media, for implementing a mutual aid network. One of the methods includes maintaining a particular blockchain specifically for handling requests for aid from a group of members; receiving transaction data encoding user responses to queries from the blockchain network for requesting the user responses regarding a particular request for aid; executing the smart contract using the particular blockchain to process the transaction data; in response to response results indicating that sufficient user responses have been received from the members of the subset of the group, and that a sufficient percentage of the subset of the group have agreed to the particular request for aid, computing an amount of contribution due to each member of the group; and instructing a gateway to trigger the amount of contribution to originate from each member of the group.

30 Claims, 8 Drawing Sheets

(56) References Cited

FOREIGN PATENT DOCUMENTS

KR        101986725        6/2019

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

MUTUAL AID NETWORK BASED ON SMART CONTRACT AND BLOCKCHAIN

CROSS-REFERENCE TO RELATED APPLICATIONS

This application is a continuation of PCT Application No. PCT/CN2019/094546, filed on Jul. 3, 2019, which is hereby incorporated by reference in its entirety.

TECHNICAL FIELD

This specification relates to blockchain implementations for executing a smart contract (or multiple instances).

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

It would be desirable to leverage blockchain networks to execute, without a centralized node, agreements among members of a collective asset, to more efficiently enforce the rights and safeguard the interests of both voting members (who can vote like a jury member) and non-voting members (those who cannot vote).

SUMMARY

This specification describes technologies for implementing a blockchain network to execute smart contract (or multiple instances) on behalf of members who share a collective asset. These technologies generally involve executing a smart contract (or multiple instances) as a special protocol used in the development of a contract class object in the blockchain network such that trusted transactions can proceed without involving third parties (such as a centralized node).

In some implementations, an example of a smart contract contains program code, stores data and transfers TOKEN functions. In these implementations, the smart contract can interact with other contract objects to invoke a vote counting process to tally and count votes from voting members. Depending on the specific criteria, the voting results are used to make a collective decision that impacts the collective asset. For example, the collective asset can be an insurance pool formed by all members while only a subset of the members have voting rights. The collective asset can also include a shared community asset, for example, an asset of a condominium organization, an asset of a professional association, an asset of an alumni association. In these implementations, the smart contract (or multiple instances) are executed on nodes of a blockchain network. The execution allows the voting results from the voting members to be calculated, for example, publicly so that all members can inspect the results (albeit some implementations may not reveal the identity of each individual voting member). The voting results further drive a decision making process to determine, for example, whether to disburse fund from the collective asset towards paying for a request submitted by one member. The decision making process may be pursuant to agreements between the members who signed up to share the collective asset. By virtue of the smart contract implementation, such transactions are traceable (for example, each vote can be traced to the corresponding voting member) and irreversible (for example, results cannot be altered by third parties).

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
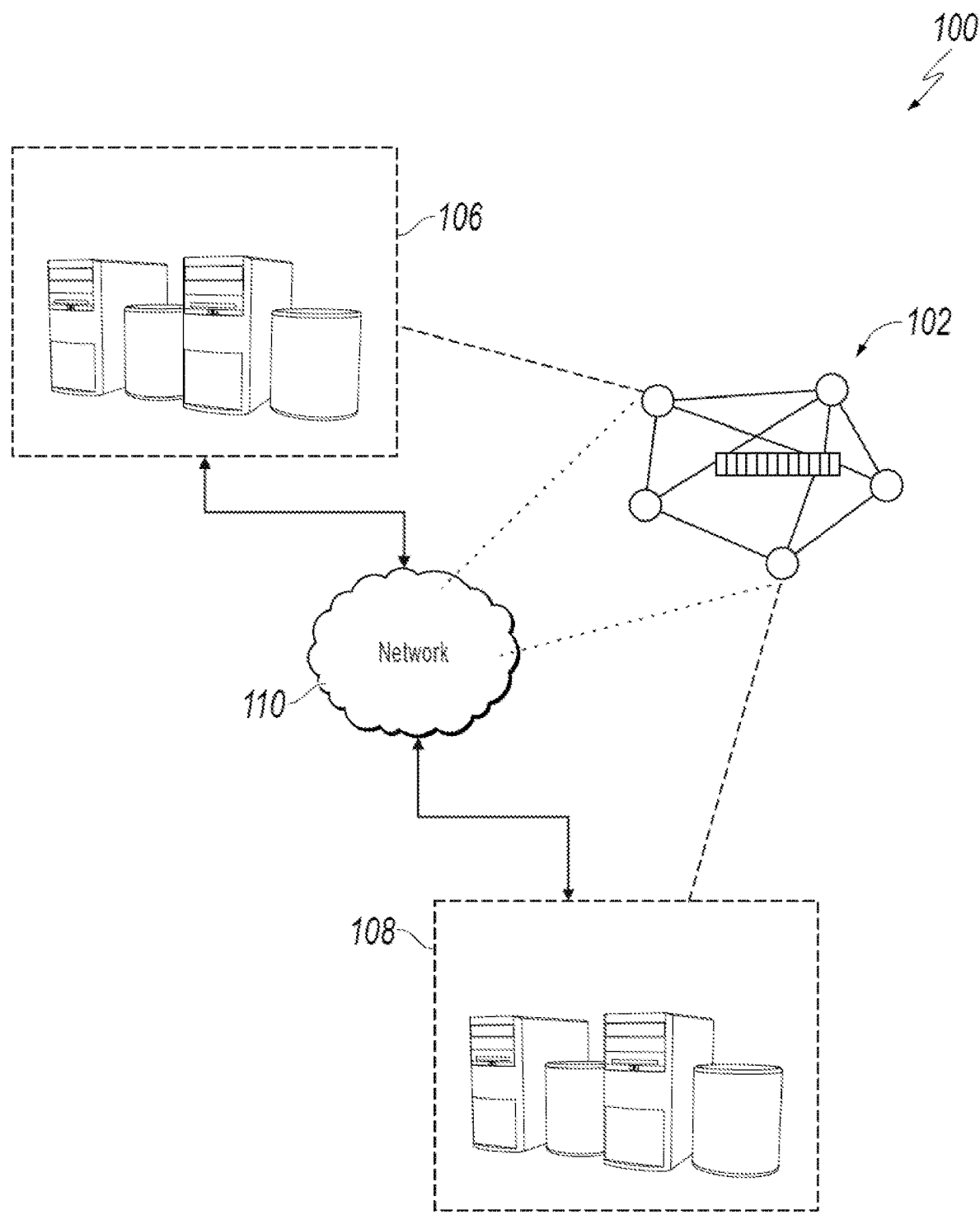
FIG. 1 is a diagram illustrating an example of an environment that can be used to execute embodiments of this specification.

Recent advances in distributed computing technologies have invigorated interest to execute smart contract through a blockchain on behalf of members who share a collective asset. These technologies generally involve executing smart contract as a special protocol used in the development of contract objects in a blockchain such that trusted transactions are allowed without involving third parties (such as a centralized node). In some embodiments, insurance coverage of the populace is instituted through a specific blockchain tailored to a group of members that can execute a smart contract or multiple instances without a centralized third party (for example, without going through an insurance carrier). The participating members can mutually insure each other through the specific blockchain to safeguard their interest in times of need, but without the overhead of traditional insurance carriers that would add delay and cost. In some cases, the specific blockchain can encode software instructions and data for handling request for insurance disbursement. In these cases, the software instructions and data may act in tandem to enforce agreements reached by members of the group with regard to specific criteria for disbursing insurance.

In more detail, the smart contract can invoke a vote counting process to tally and count votes from voting members selected from the contributing members. Depending on the specific criteria, the voting results are used to make a collective decision on whether to approve a particular request for insurance disbursement. In these implementations, the smart contract or multiple instances are executed on nodes of a blockchain network. The execution allows the voting results from the voting members to be calculated, for example anonymously and confidentially. The voting results further drive a decision making process to determine, for example, whether to disburse fund towards paying for a request submitted by one member. The decision making process may be pursuant to agreements between the members who signed up to share the collective asset. By virtue of the smart contract implementation, the transactions are digitized and secure. In one aspect, the transactions are traceable (for example, each vote can be traced to the corresponding voting member) so that each participating member can potentially track the progress when the specific blockchain is used to process the particular request for insurance disbursements. In another aspect, the transactions are irreversible and tamper-proof (for example, results cannot be altered by third parties). Moreover, these cases are not limited to handling insurance disbursement. In fact, other communal assets that used to be managed by a centralized body at the expense of community members may also benefit from the embodiments described in this specification. Additional details of the implementations are discussed below.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
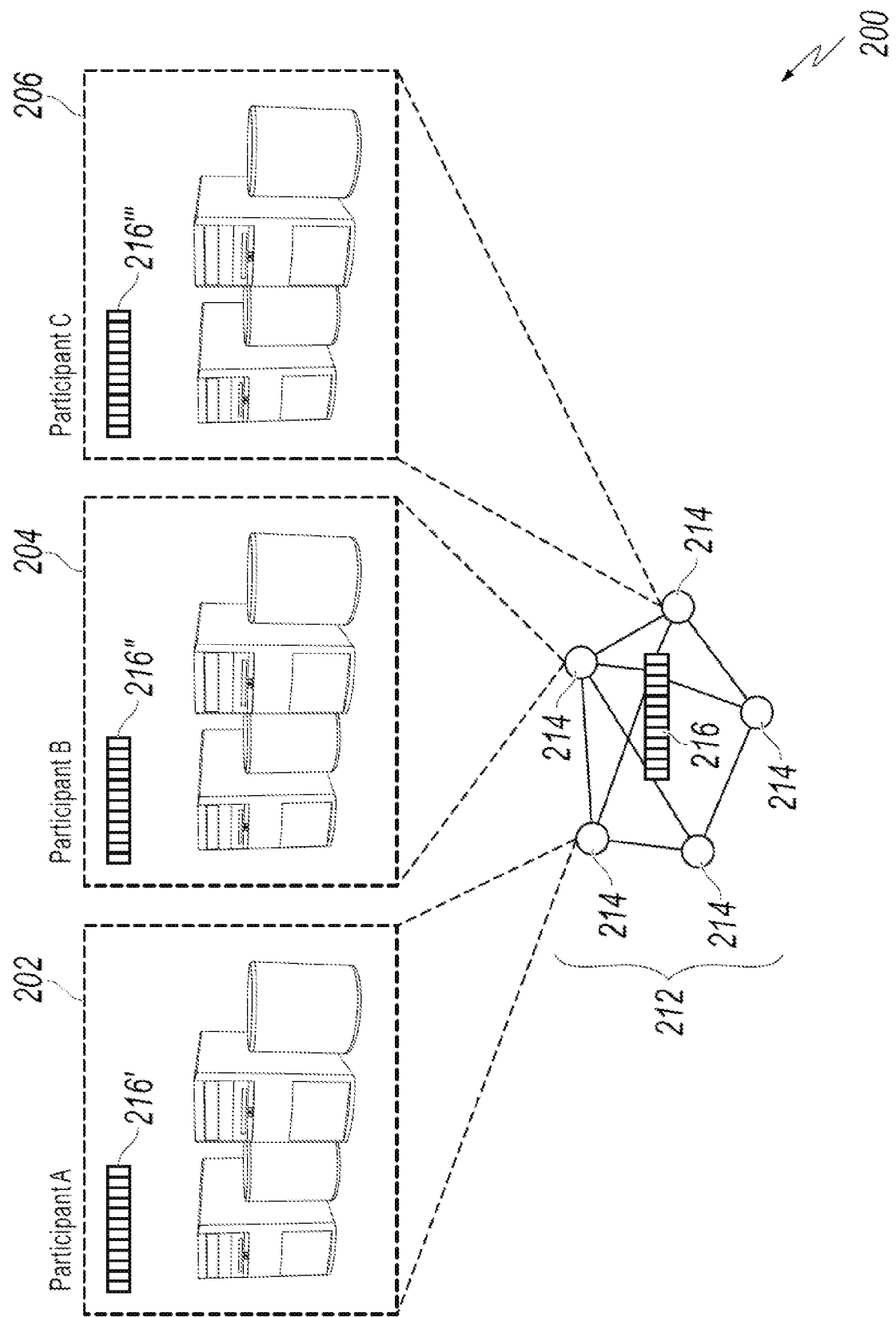
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In the above context, this specification further describes specific blockchain implementations to institute insurance coverage for a group of contributing members by executing a smart contract or multiple instances without a centralized third party (for example, without going through insurance carriers). These examples are not limited to handling insurance disbursements. Instead, the embodiments described by this specification describe technologies that can benefit a variety of community activities online.

Figure 3A:
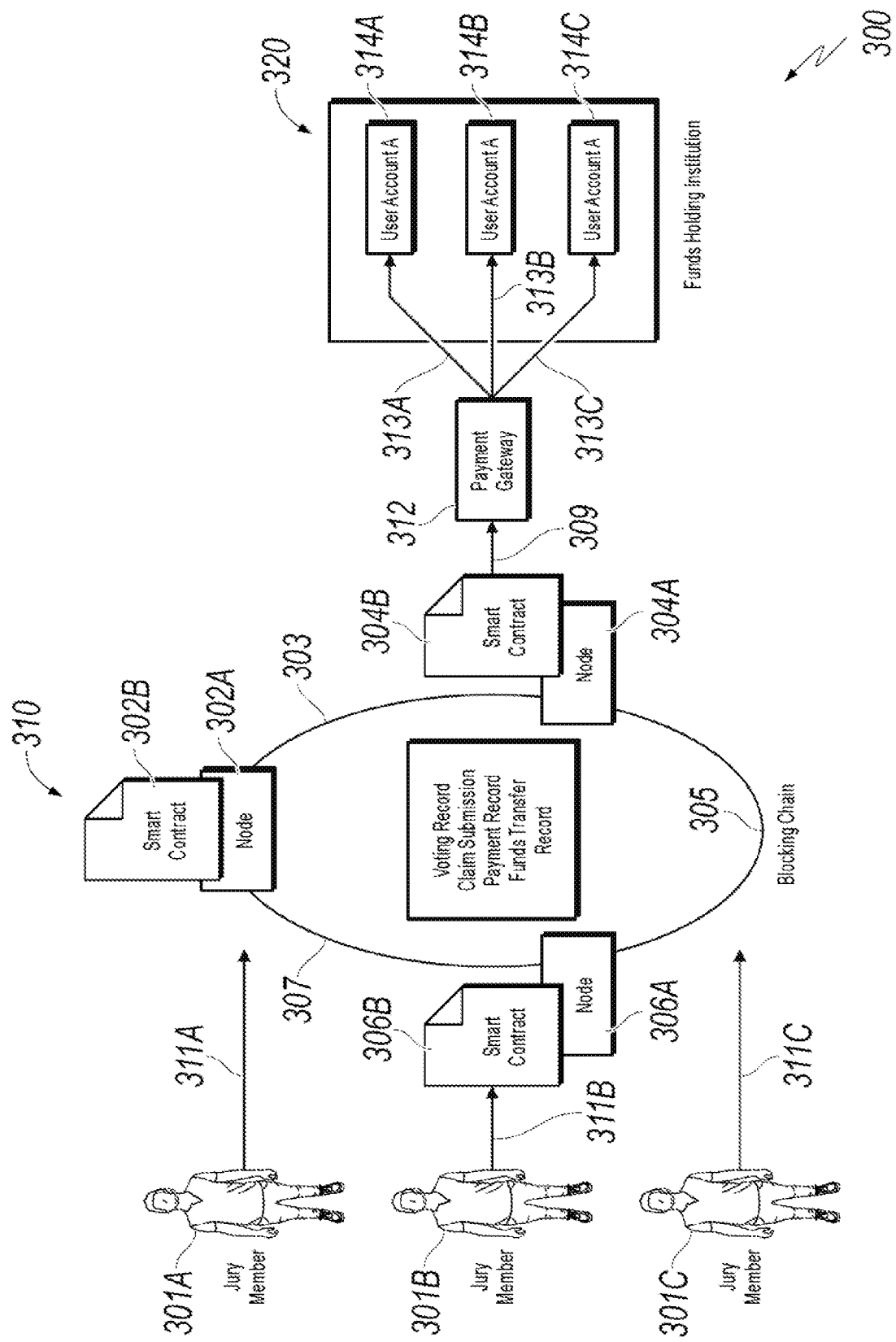
FIG. 3A is a diagram illustrating an example of an environment for handling requests for insurance disbursements from a joint account at a blockchain in accordance with embodiments of this specification.
Figure 3B:
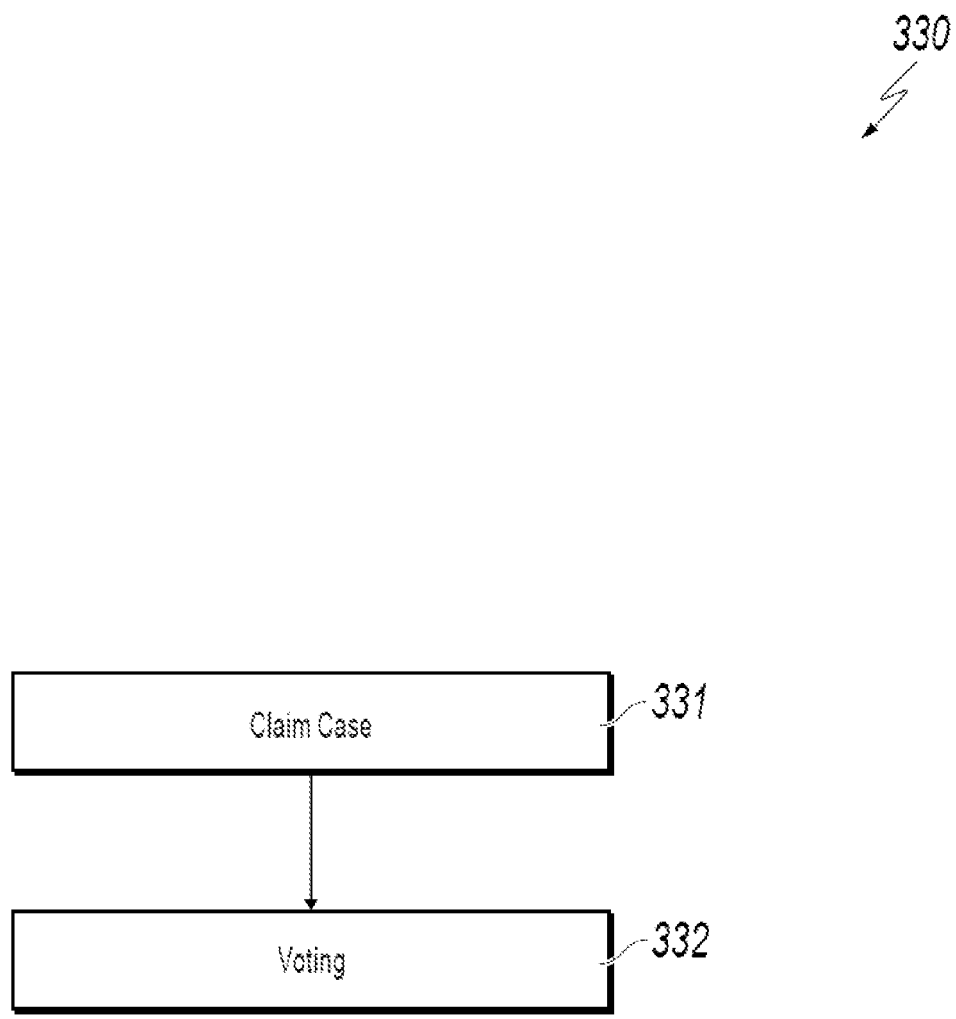
FIG. 3B is another diagram illustrating an example of a workflow process in the environment of FIG. 3A.
Figure 4:
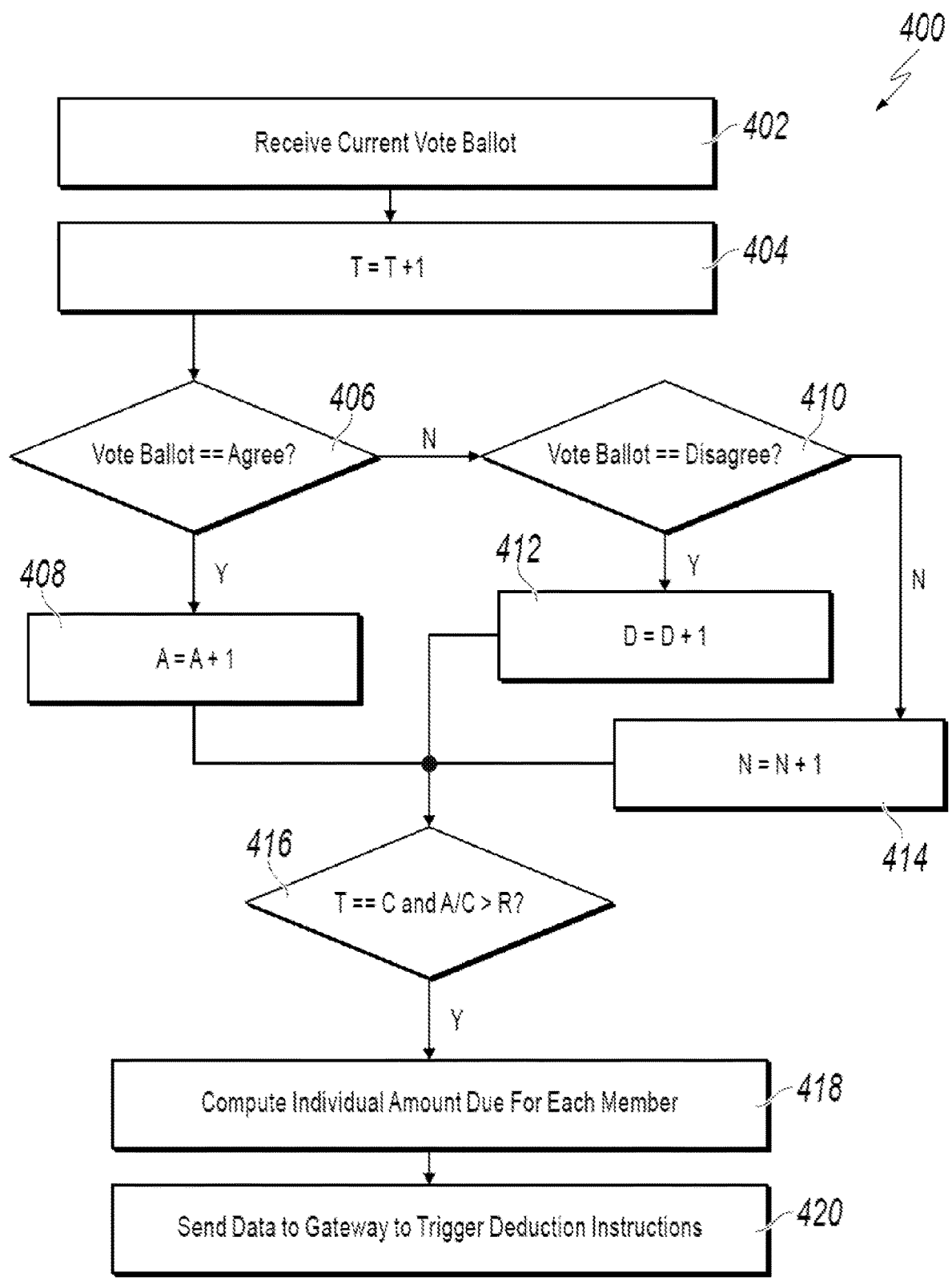
FIG. 4 is a diagram illustrating an example of vote calculation in accordance with embodiments of this specification.

Referring to FIGS. 3A, 3B, and 4, environment 300 illustrates an example for handling requests for insurance disbursements from a joint account at a blockchain. Environment 300 describes a form of mutual aid insurance among members who participate in this mutual assistance to jointly to share the burden of dispensing insurance payments to individuals for compensation of, for example, medical expenses, or accidental losses. This form of mutual aid insurance is without a centralized organization, such as insurance carriers. As such, this form of mutual aid insurance operates without insurance agents, and the intermediary overhead. This specification discloses mechanisms under blockchain implementations for the participants to electronically determine, in a distributed manner, whether a submitted claim for compensation meets the conditions for payment. Among them, the jury is a mechanism that can operate effectively to allow voting members from the participants to directly vote. Only jury members can vote, based on their thorough review of the submitted request. The review process can be electronic and confidential (for example, without revealing the identity of the claimant). If the jury votes indicate that the submission meets the agreed-on conditions, the blockchain implementation can collect contributions from all participating members and dispense funds to support the claimant on behalf of all participating members. The embodiments described in this specification can implement an automatic claim payment method based on smart contract (or multiple instances). The operation includes uploading the jury's voting results to a specific blockchain, using the smart contract mechanism to count the voting result, and triggering automatic payment. The embodiments allow the flow of funds to be open and transparent, and achieving mutual assistance through decentralized autonomous management.

In more detail, a blockchain implementation is specifically tailored to a pool of participants so that only the pool of participants can securely sign up to subscribe to a mutual assistance plan. In this mutual assistance plan, the blockchain implementation allows jury members 301A, 301B, and 301C to be selected from the pool of participants. When a member from the pool of participants submits a claim for fund disbursement to cover an expense (for example, medical expenses, accidental losses, disaster relief), the blockchain implementation executes software codes to call upon jury members 301A, 301B, and 301C to review the claim details to determine whether to approve payment for the submitted claim from a collective asset owned by all participants. These jury members are voting members selected from the pool of participants according to specific protocols programmed as a well-oiled machine. The term for these jury members may be limited by the well-oiled machine. The jury members 301A, 301B, and 301C may also be selected from the pool of participants on an on-demand basis when a new claim is submitted by the well-oiled machine.

The blockchain implementation can project mini-programs to each of the jury members 301A, 301B, and 301C for each jury member to review the details of the submitted claim and then casts her/his vote on whether to approve disbursement by taking funds from a joint account shared by the pool of participants. As illustrated, blockchain network 310 includes nodes 302A, 304A, and 306A. In some cases, nodes 302A, 304A, and 306A are consensus nodes. Each node includes computing resources and may take the form of virtualization to provide a web service to package hardware (such as servers, desktops, file storage) into instances with scalable capabilities. Nodes 302A, 304A, and 306A are connected by links 303, 305, and 307. The links can include any form of a communication link, for example, a fiber optic link, a wireless link, an Ethernet link, a digital subscriber line (DSL) link, or a coaxial cable link. As described above in FIG. 2 with respect to blockchain network 212, the mini-programs projected to jury members 301A, 301B, and 301C may respectively communicate with participants systems 202, 204, and 206 (as depicted in FIG. 2) to tap into the multi-node blockchain network 310 via links 311A, 311B, and 311C. Like the blockchain network 212 of FIG. 2, the blockchain network 310 provides a peer-to-peer network over which a specific blockchain containing smart contract copies 302B, 304B, and 306B that operate to record data (such as voting records and claim submissions) and manage accounts funded by all participants of the group. The specific blockchain includes software instructions (for executing a smart contract or multiple instances) as well as data entries (for maintaining transaction records). The specific blockchain may include a federated blockchain or a consortium blockchain.

In more detail, the mini-programs projected to jury members 301A, 301B, and 301C respectively communicate with the blockchain network 310 via links 311A, 311B, and 311C. In these cases, blockchain data is received by each node 302A, 304A, and 306A. Such blockchain data encodes details of the submitted claim and the smart contract or multiple instances for the pool of members in the mutual assistance program. Details of the submitted claim may include details of the disease or accident, diagnosis of the condition, prognosis of progression, treatment options, cost estimate, profile of the claimant, etc. The details may be then provided to jury members 301A, 302B, and 301C anonymously without revealing the identity of the claimant. Such details may also be provided on demand, especially when some jury members ask additional questions by requesting more documentations. These details may be encrypted as described above in the context of FIG. 2.

Next, the mini-programs projected to jury members 301A, 301B, and 301C allow the jury members to cast their votes (332) to adjudicate the claim case (331) through blockchain network 310, as illustrated by chart 330 under the environment 300. In this context, flow chart 400 provides further details of vote calculation in accordance with embodiments of this specification, as described below.

Initially, blockchain network 310, receives data encoding a voting ballot from a jury member as a voting member of the pool of participants (402). The number of tally count T is then incremented by 1 (404). Thereafter, the voting ballot is inspected to determine whether the jury member agrees to disburse fund for the submitted claim 406). If the vote indicates agreement, then counter A (for agreement) is incremented by 1 (408). If not, then voting ballot is inspected to determine whether the jury member disagrees with the proposed disbursement (410). If the vote indicates disagreement, then counter D (for disagreement) is incremented by 1 (412). Otherwise, counter N is incremented by 1 (414). Next, the number of tally count (T) is compared to a pre-determined threshold number C and the ratio of agreement over total tally is compared to a pre-determined threshold level R (416). When the number of tally counter T reaches the threshold level C, a sufficient number of jury members have voted on behalf of all participants. When the ratio of those agreement votes over the total votes have surpassed the pre-determined threshold level R, a sufficient percentage of jury members have agreed to the requested fund disbursement. In response to both conditions being met, the blockchain network 310 computes an individual amount of contribution due from each participant in the pool (418). In some cases, the pool of participants can be fairly large (for example, in the millions), thereby spreading the risk and reducing the amount due for each member. Thereafter, the blockchain network 310 sends data to a gateway (for example, through link 309 to payment gateway 312) to trigger the individual amount to be deduced from each member's account (420). As illustrated in FIG. 3, the deduction instructions are sent to funds holding institution 320. For example, the deduction instructions 313A, 313B, and 313C are respectively sent to individual accounts 314A, 314B, and 314C. Here, the smart contract implementations at blockchain network 310 allow individual instructions to be sent to each member's account securely. The communication may incorporate the encryption/decryption methodologies described above in the context of FIG. 2. As a result, the contributions are collected from all members. The collection may then be forwarded to the member who has submitted the claim. Each transaction is recorded in the blockchain network 310 to allow for traceability to deter spoofing and data tampering.

Figure 5:
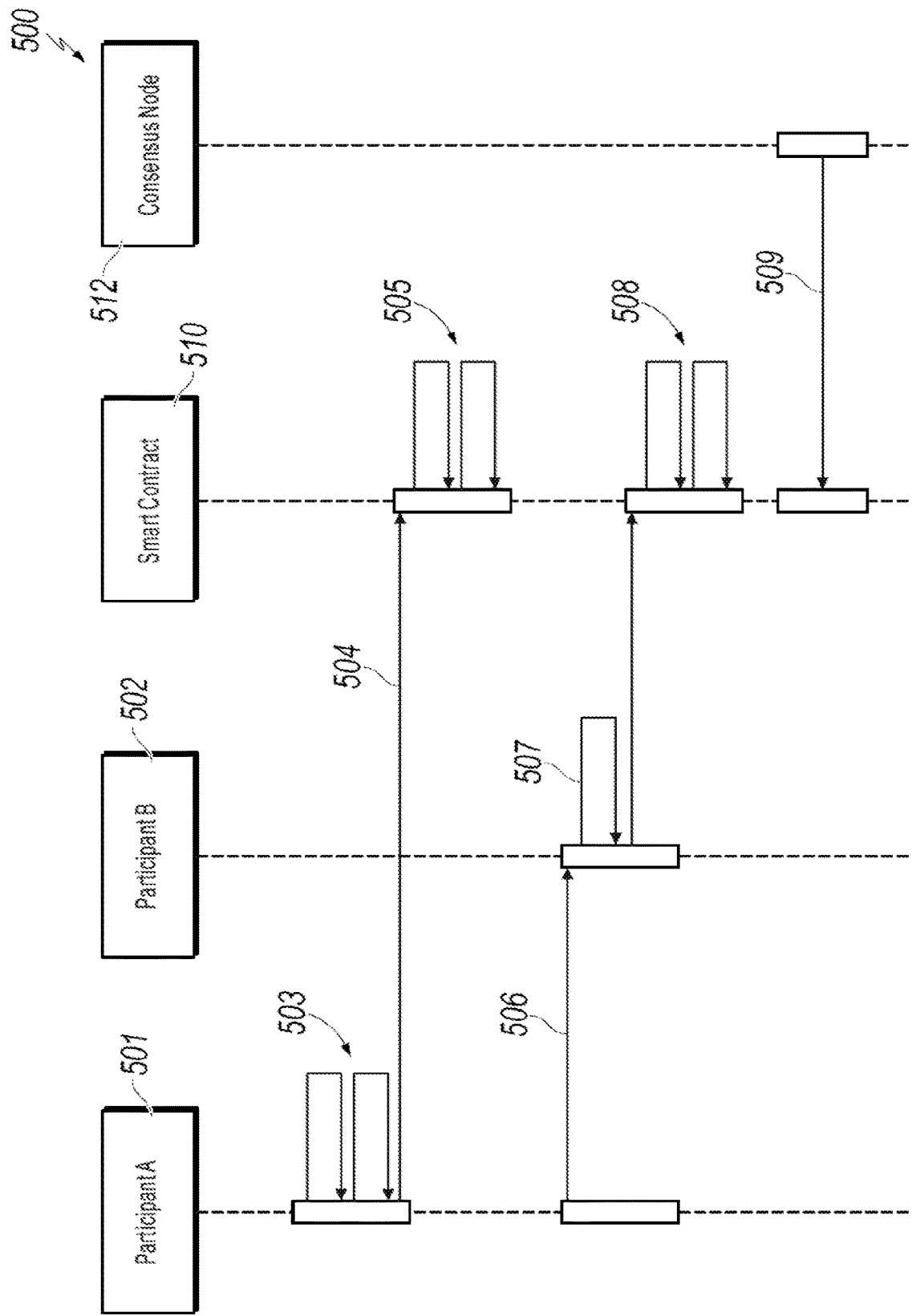
FIG. 5 is a diagram illustrating an example of a flow chart in accordance with embodiments of this specification.
Figure 6:
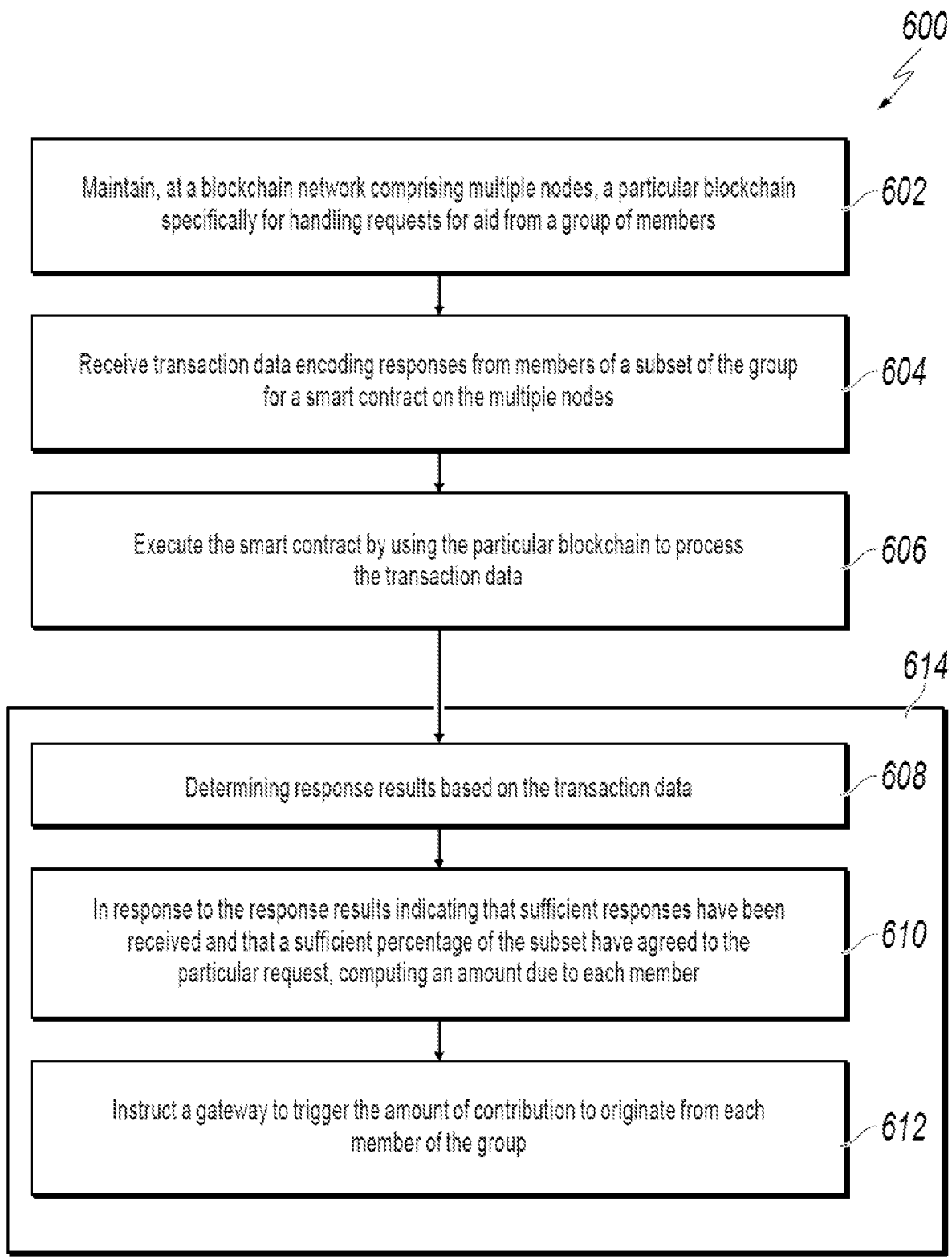
FIG. 6 depicts an example of a process that can be executed in accordance with embodiments of this specification.

Further referring to FIGS. 5 and 6, an example of a flow chart 600 for handling a request for an insurance disbursement is illustrated in the context of diagram 500 for executing a smart contract (or multiple instances of a smart contract) via nodes in accordance with embodiments of this specification. Initially, the blockchain network maintains a particular blockchain specifically for handling requests for fund from a group of members (602). The blockchain network includes multiple nodes, an example of which is node 512. More illustrations can be found in FIG. 3A (showing blockchain network 310 with nodes 302A, 304A, and 306A) and FIG. 2 (blockchain network 212 with nodes 214).

The blockchain network receives transaction data encoding responses from members of a subset of the group of members for a smart contract on the multiple nodes (604). Here, the subset of members are those who are selected from the group of members (604). Here, transaction data from a particular member of the subset of the group of members includes information representing a user response by the particular member regarding a particular request for aid from the group of members. Here, the transaction data from the particular member is received when the particular member enters input when queries from the blockchain network are received, prompting the particular member to weigh in regarding the particular request on the particular member's computing device. The user response of the particular member is then encoded as transaction data and sent to a particular node to trigger an execution of the smart contract. An example of an instance of the smart contract is 510. Additional illustrations include various instances of smart contract 302B, 304B, and 306B in FIG. 3.

The blockchain network then executes the smart contract (or multiple instances) via the particular blockchain to process transaction data from the members of the subset of the group of members (606). The members of the subset of the group of members may also be known as voting members or jury members. For example, voting members may operate as participant A (501) and participant B (502). Participant A may first review claim submission and cast a vote, thereby leaving transaction data 503. The transaction data 503 is transferred and captured by smart contract 510 (as illustrated in arrow 504 and through operation 505) to, for example, append to the specific blockchain. Thereafter, participant B (502) may further review claim submission and cast an additional vote, thereby leaving a transaction data 507 (for example, entered after message 506 from participant A). The transaction data 507 can likewise be transferred and captured by smart contract 510 (508) to further append to the specific blockchain. The node 512 is incentivized to maintain an updated copy of the smart contract via operation 509. Additional detailed examples of processing the voting results are provided above in the descriptions for FIGS. 3A and 3B of this specification.

Executing the smart contract encompasses the following steps inside block 614. Initially, executing the smart contract includes determining response results based on the transaction data (608). Next, in response to the response results indicating that sufficient user responses have been received from the subset of the group of members and that a sufficient percentage of the subset of the group of members have agreed to the particular request for aid, the blockchain network computes an amount of contribution due from each member of the group of members (610). The blockchain network then instructs a gateway to trigger the amount of contribution to originate from each member of the group of members (612). The gateway can function as a bridge to each member's individual account at the member's financial institutions. In some cases, the gateway can provide a withholding service (such as an escrow service). In these cases, all participating members open an account at an institution and deposit sufficient amount of funds. After receiving the withholding instruction sent by the smart contract, as illustrated in the examples from FIGS. 2 and 3A, the institution deducts the assessed amount from each member's account and then transfers it to the claimant's account. Detailed examples of sending payment instructions and collecting individual contributions can be found, for example, in the descriptions for FIG. 3A.

Figure 7:
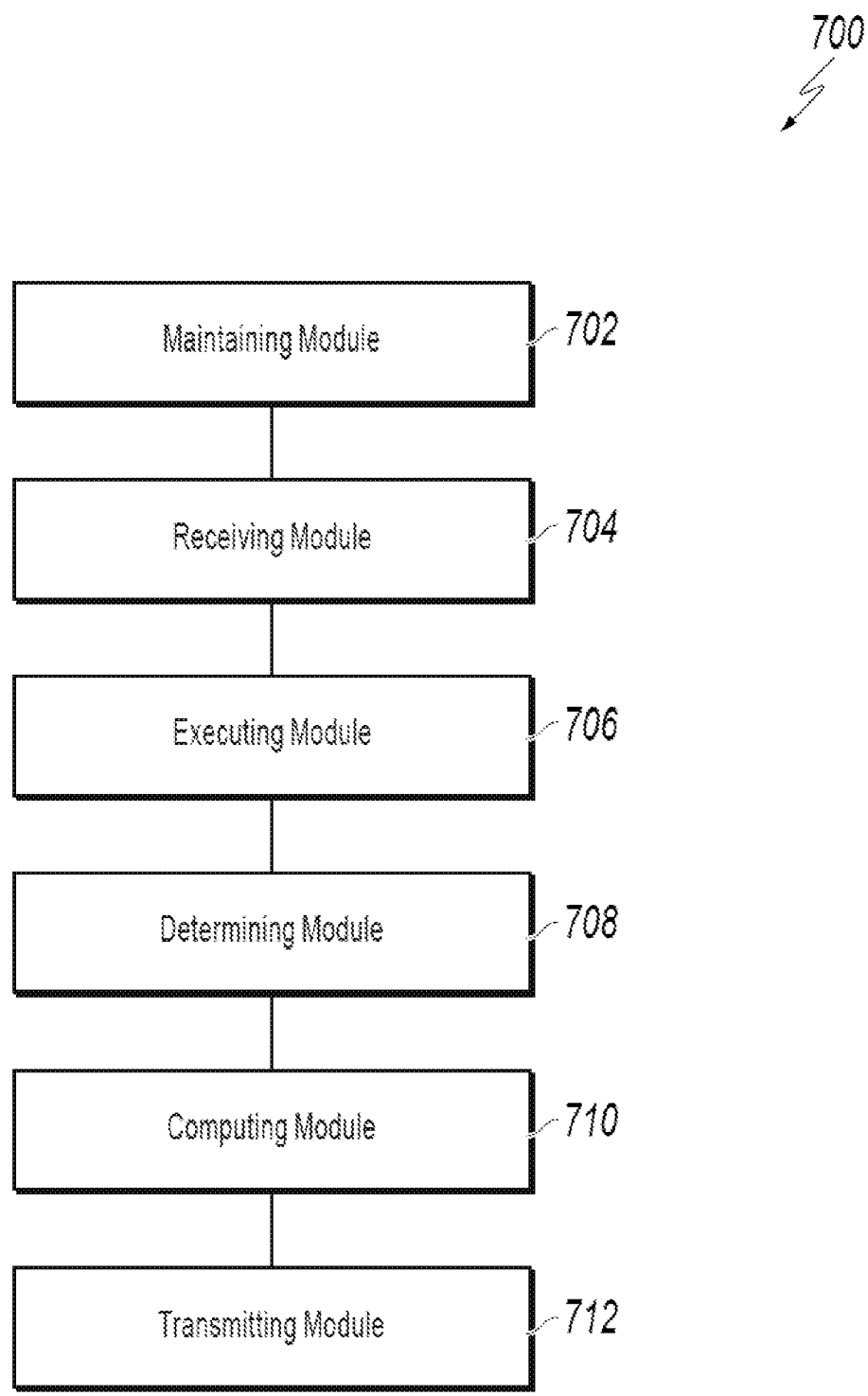
FIG. 7 depicts examples of modules of an apparatus in accordance with embodiments of this specification.

FIG. 7 depicts examples of modules of an apparatus 700 in accordance with embodiments of this specification. The apparatus 700 can be an example of an embodiment of a blockchain network for handling fund disbursement from a joint account on a particular blockchain. The apparatus 700 can correspond to the embodiments described above, and the apparatus 700 includes the following: a maintaining module 702 for maintaining the specific blockchain for the group of members participating in a mutual assistance network, a receiving module 704 for receiving transaction data from the voting members selected from all members in the group of members, an executing module 706 for executing the smart contract on multiple nodes by using the specific blockchain to process the transaction data, a determining module 708 for determining response results based on the transaction data, a computing module 710 for computing individual contributions due from each member of the group, and a transmitting module 712 for transmitting payment information to a gateway so that individual contributions can be collected from all members of the group. In some instances, the determining module 708, the computing module 710, and the transmitting module 712 can be consolidated as one module.

In an optional embodiment, the apparatus 700 further includes the following: a receiving sub-module for receiving the amount of contribution from each member; and a transmitting sub-module for forwarding the amount of contribution a particular member who initially submitted the particular request for the particular fund.

In an optional embodiment, the apparatus 700 further includes a recording sub-module for recording a transaction log for handling the particular request for fund, wherein the transaction log includes a sequence triggering the amount of contribution from each member, and forwarding the amount of contribution to the particular member who initially submitted the particular request. In this optional embodiment, the transaction log is visible to all members of the group sharing an account at the nodes of the blockchain network.

In an optional embodiment, the executing module 706 uses a first counter to calculate a first number of votes received from the voting members. In this optional embodiment, the voting results indicate that sufficient voting members have voted when the first number of votes have reached a first pre-determined threshold. In this optional embodiment, in response to the vote by the particular voting member indicating agreement to the particular request for aid, the executing module 706 updates a second counter to record a second number of votes for the particular request; and in response to the vote by the particular voting member indicating disagreement with the particular request for aid, the executing module 706 updates a third counter to record a third number of votes against the particular request. In this optional embodiment, in response to the vote by the particular voting member indicating neither agreement nor disagreement, the executing module 706 uses a fourth counter to calculate a fourth number for abstention. In this optional embodiment, the voting results indicate that a sufficient percentage of voting members have agreed with the particular request when the ratio of the second number over the first number has surpassed a second pre-determined threshold. In this optional embodiment, executing the smart contract at the particular blockchain is performed by running software code contained in the smart contract on the nodes of the blockchain network.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a blockchain network that includes nodes. An execution body in essence can be an electronic device, and the electronic device includes the following: one or more processors; and a memory configured to store an executable instruction of the one or more processors.

The techniques described in this specification produce one or more technical effects. In some embodiments, software codes implementing a smart contract (or multiple instances of a smart contract) are maintained on nodes of a blockchain network. The smart contract implementations operate to process voting result and automatically trigger payout for each approved case, without the overhead of a third-party. In some embodiments, the smart contract implementations provide a withholding service for all participating members in a mutual assistance network without de-centralized agency. In these embodiments, the smart contract implementations enable a withholding service where all participating members keep their deposits. After a particular request for a claim for medical assistance, the smart contract implementations can automatically assess an amount from each member of the group, deduct the assessed amount from each member's account, and transfers the amount to the claimant. In some embodiments, the smart contract implementations are part of a specific blockchain for the group of members in a mutual assistance network. The specific blockchain encodes transaction records for each claim submission (including voting results from voting members, and the payout sequence) such that the full transaction records are visible to each member. In these embodiments, the blockchain may not reveal the identity of the claimant and each voting member).

Described embodiments of the subject matter can include one or more features, alone or in combination.

For example, in a first embodiment, a particular blockchain is maintained at a blockchain network comprising multiple nodes. This particular blockchain is specifically for handling requests for aid from a group of members. Data encoding votes from voting members is then received at the blockchain network. The voting members are selected from the group of members. Data from each voting member includes information representing a vote by a particular voting member regarding a particular request for aid from the group of members. The smart contract or multiple instances are then executed via the particular blockchain to process voting results from the voting members. In response to the voting results indicating that sufficient voting members have voted and that a sufficient percentage of voting members have agreed to the particular request for aid, the blockchain network computes an amount of contribution due to each member of the group. The blockchain network then instructs a gateway to trigger the amount of contribution to originate from each member of the group. The foregoing and other described embodiments can each, optionally, include one or more of the following features:

A first feature, combinable with any of the following features, specifies that the blockchain network receives the amount of contribution from each member; and forwards the amount of contribution from each member to a particular member who initially submitted the particular request for aid.

A second feature, combinable with any of the previous or following features, specifies that the blockchain network records a transaction log for handling the particular request for fund, wherein the transaction log includes a sequence triggering the amount of contribution from each member, and forwards the amount of contribution to the particular member who initially submitted the particular request. In this second feature, the transaction log is visible to all members of the group sharing an account at the nodes of the blockchain network.

A third feature, combinable with any of the previous or following features, specifies that the specific blockchain uses a first counter to calculate a first number of votes received from the voting members, wherein the voting results indicate that sufficient voting members have voted when the first number of votes have reached a first pre-determined threshold. In this third feature, in response to the vote by the particular voting member indicating agreement to the particular request for aid, the specific blockchain updates a second counter to record a second number of votes for the particular request; and in response to the vote by the particular voting member indicating disagreement with the particular request for aid, the specific blockchain updates a third counter to record a third number of votes against the particular request. In this third feature, in response to the vote by the particular voting member indicating neither agreement nor disagreement, the specific blockchain uses a fourth counter to calculate a fourth number for abstention. In this third feature, the voting results indicate that a sufficient percentage of voting members have agreed with the particular request when the ratio of the second number over the first number has surpassed a second pre-determined threshold.

A fourth feature, combinable with any of the previous or following features, specifies that executing the smart contract or multiple instances at the particular blockchain is performed by running software code contained in the smart contract on the nodes of the blockchain network.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for rendering mutual assistance, the computer-implemented method comprising:
    maintaining, at a blockchain network comprising multiple nodes, a particular blockchain specifically for handling requests for aid from a group of members;
    receiving, at the blockchain network, a particular request for aid;
    in response to receiving the particular request for aid, providing a computer-executable code to a computing device associated with each of a subset of the group of members, wherein:
        the computer-executable code includes details of the request, and is configured to request user-responses on whether to approve disbursement through a payment gateway, and
        the computer-executable code is configured to allow communication among the computing devices of the subset of the group of members to store records of transactions on the blockchain network;
    receiving, at the blockchain network, transaction data from the computing devices of the subset of the group of members for a smart contract on the multiple nodes, wherein the transaction data encode user responses to queries from the blockchain network for requesting the user responses at the computing devices of the members of the subset of the group of members regarding the particular request for aid from the group of members; and
    executing the smart contract on the multiple nodes using the particular blockchain to process the transaction data by:
        determining, based on the transaction data, response results that indicate that at least a first number of user responses have been received from the members of the subset of the group of members, and that at least a threshold percentage of the members of the subset of the group of members have agreed to the particular request for aid;
        in response to determining that the response results indicate that at least the first number of user responses have been received from the members of the subset of the group of members, and that a at least the threshold percentage of the members of the subset of the group of members have agreed to the particular request for aid, computing an amount of contribution due to each member of the group of members, and
        automatically generating instructions for the payment gateway to trigger the amount of contribution to originate from each member of the group of members.

2. The computer-implemented method of claim 1, further comprising:
    receiving, at the blockchain network, the amount of contribution from each member; and
    forwarding the amount of contribution from each member to a particular member who initially submitted the particular request for aid.

3. The computer-implemented method of claim 2, further comprising:
    recording, using the particular blockchain, a transaction log for handling the particular request for aid, wherein the transaction log includes a sequence of triggering the amount of contribution from each member and forwarding the amount of contribution to the particular member who initially submitted the particular request.

4. The computer-implemented method of claim 3, wherein the transaction log is visible to all members of the group of members sharing an account at the multiple nodes of the blockchain network.

5. The computer-implemented method of claim 1, wherein determining the response results based on the transaction data comprises:
    using a first counter to calculate the first number of user responses received from the members of the subset of the group of members.

6. The computer-implemented method of claim 5, wherein the response results indicate that sufficient user responses have been received from the members of the subset of the group of members when the first number of user responses have reached a first pre-determined threshold.

7. The computer-implemented method of claim 6, wherein determining the response results based on the transaction data further comprises:
    in response to the transaction data from a computing device of a particular member of the subset of the group of members indicating agreement to the particular request for aid, updating a second counter to record a second number of user responses for the particular request; and
    in response to the transaction data from a computing device of a particular member of the subset of the group of members indicating disagreement with the particular request for aid, updating a third counter to record a third number of user responses against the particular request.

8. The computer-implemented method of claim 7, wherein executing the smart contract using the particular blockchain to process the transaction data further comprises:
    in response to the transaction data from a computing device of the particular member of the subset of the group of members indicating neither agreement nor disagreement, using a fourth counter to calculate a fourth number indicating an abstention.

9. The computer-implemented method of claim 8, wherein the response results indicate that a sufficient percentage of the members of the subset of the group of members have agreed with the particular request when a ratio of the second number of user responses over the first number of user responses has surpassed a second pre-determined threshold.

10. The computer-implemented method of claim 1, wherein executing the smart contract using the particular blockchain to process transaction data is performed by running software code contained in the smart contract on the multiple nodes of the blockchain network.

11. A non-transitory, computer-readable storage medium storing one or more instructions executable by a computer system to perform operations for rendering mutual assistance, the operations comprising:
    maintaining, at a blockchain network comprising multiple nodes, a particular blockchain specifically for handling requests for aid from a group of members;
    receiving, at the blockchain network, a particular request for aid;

in response to receiving the particular request for aid, providing a computer-executable code to a computing device associated with each of a subset of the group of members, wherein:
the computer-executable code includes details of the request, and is configured to request user-responses on whether to approve disbursement through a payment gateway, and
the computer-executable code is configured to allow communication among the computing devices of the subset of the group of members to store records of transactions on the blockchain network;
receiving, at the blockchain network, transaction data from the computing devices of the subset of the group of members for a smart contract on the multiple nodes, wherein the transaction data encode user responses to queries from the blockchain network for requesting the user responses at the computing devices of the members of the subset of the group of members regarding the particular request for aid from the group of members; and
executing the smart contract on the multiple nodes using the particular blockchain to process the transaction data by:
determining, based on the transaction data, response results that indicate that at least a first number of user responses have been received from the members of the subset of the group of members, and that at least a threshold percentage of the members of the subset of the group of members have agreed to the particular request for aid;
in response to determining that the response results indicate that at least the first number of user responses have been received from the members of the subset of the group of members, and that a at least the threshold percentage of the members of the subset of the group of members have agreed to the particular request for aid, computing an amount of contribution due to each member of the group of members, and
automatically generating instructions for the payment gateway to trigger the amount of contribution to originate from each member of the group of members.

12. The non-transitory, computer-readable storage medium of claim 11, the operations further comprising:
receiving, at the blockchain network, the amount of contribution from each member; and
forwarding the amount of contribution from each member to a particular member who initially submitted the particular request for aid.

13. The non-transitory, computer-readable storage medium of claim 12, the operations further comprising:
recording, using the particular blockchain, a transaction log for handling the particular request for aid, wherein the transaction log includes a sequence of triggering the amount of contribution from each member and forwarding the amount of contribution to the particular member who initially submitted the particular request.

14. The non-transitory, computer-readable storage medium of claim 13,
wherein the transaction log is visible to all members of the group of members sharing an account at the multiple nodes of the blockchain network.

15. The non-transitory, computer-readable storage medium of claim 11, wherein determining the response results based on the transaction data comprises:
using a first counter to calculate the first number of user responses received from the members of the subset of the group of members.

16. The non-transitory, computer-readable storage medium of claim 15,
wherein the response results indicate that sufficient user responses have been received from the members of the subset of the group of members when the first number of user responses have reached a first pre-determined threshold.

17. The non-transitory, computer-readable storage medium of claim 16, wherein determining the response results based on the transaction data further comprises:
in response to the transaction data from a computing device of a particular member of the subset of the group of members indicating agreement to the particular request for aid, updating a second counter to record a second number of user responses for the particular request; and
in response to the transaction data from a computing device of a particular member of the subset of the group of members indicating disagreement with the particular request for aid, updating a third counter to record a third number of user responses against the particular request.

18. The non-transitory, computer-readable storage medium of claim 17, wherein executing the smart contract using the particular blockchain to process the transaction data further comprises:
in response to the transaction data from a computing device of the particular member of the subset of the group of members indicating neither agreement nor disagreement, using a fourth counter to calculate a fourth number indicating an abstention.

19. The non-transitory, computer-readable storage medium of claim 18, wherein the response results indicate that a sufficient percentage of the members of the subset of the group of members have agreed with the particular request when a ratio of the second number of user responses over the first number of user responses has surpassed a second pre-determined threshold.

20. The non-transitory, computer-readable storage medium of claim 11, wherein executing the smart contract using the particular blockchain to process transaction data is performed by running software code contained in the smart contract on the multiple nodes of the blockchain network.

21. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for rendering mutual assistance, the operations comprising:
maintaining, at a blockchain network comprising multiple nodes, a particular blockchain specifically for handling requests for aid from a group of members,
receiving, at the blockchain network, a particular request for aid;
in response to receiving the particular request for aid, providing a computer-executable code to a computing device associated with each of a subset of the group of members, wherein:
the computer-executable code includes details of the request, and is configured to request user-responses on whether to approve disbursement through a payment gateway, and the computer-executable code is configured to allow communication among the computing devices of the subset of the group of members to store records of transactions on the blockchain network;

receiving, at the blockchain network, transaction data from the computing devices of the subset of the group of members for a smart contract on the multiple nodes, wherein the transaction data encode user responses to queries from the blockchain network for requesting the user responses at the computing devices of the members of the subset of the group of members regarding the particular request for aid from the group of members, and executing the smart contract on the multiple nodes using the particular blockchain to process the transaction data by:

determining, based on the transaction data, response results that indicate that at least a first number of user responses have been received from the members of the subset of the group of members, and that at least a threshold percentage of the members of the subset of the group of members have agreed to the particular request for aid, in response to determining that the response results indicate that at least the first number of user responses have been received from the members of the subset of the group of members, and that a at least the threshold percentage of the members of the subset of the group of members have agreed to the particular request for aid, computing an amount of contribution due to each member of the group of members, and automatically generating instructions for the payment gateway to trigger the amount of contribution to originate from each member of the group of members.

22. The system of claim 21, the operations further comprising:

receiving, at the blockchain network, the amount of contribution from each member; and forwarding the amount of contribution from each member to a particular member who initially submitted the particular request for aid.

23. The system of claim 22, the operations further comprising:

recording, using the particular blockchain, a transaction log for handling the particular request for aid, wherein the transaction log includes a sequence of triggering the amount of contribution from each member and forwarding the amount of contribution to the particular member who initially submitted the particular request.

24. The system of claim 23, wherein the transaction log is visible to all members of the group of members sharing an account at the multiple nodes of the blockchain network.

25. The system of claim 21, wherein determining the response results based on the transaction data comprises:

using a first counter to calculate the first number of user responses received from the members of the subset of the group of members.

26. The system of claim 25, wherein the response results indicate that sufficient user responses have been received from the members of the subset of the group of members when the first number of user responses have reached a first pre-determined threshold.

27. The system of claim 26, wherein determining the response results based on the transaction data further comprises:

in response to the transaction data from a computing device of a particular member of the subset of the group of members indicating agreement to the particular request for aid, updating a second counter to record a second number of user responses for the particular request; and in response to the transaction data from a computing device of a particular member of the subset of the group of members indicating disagreement with the particular request for aid, updating a third counter to record a third number of user responses against the particular request.

28. The system of claim 27, wherein executing the smart contract using the particular blockchain to process the transaction data further comprises:

in response to the transaction data from a computing device of the particular member of the subset of the group of members indicating neither agreement nor disagreement, using a fourth counter to calculate a fourth number indicating an abstention.

29. The system of claim 28, wherein the response results indicate that a sufficient percentage of the members of the subset of the group of members have agreed with the particular request when a ratio of the second number of user responses over the first number of user responses has surpassed a second pre-determined threshold.

30. The system of claim 21, wherein executing the smart contract using the particular blockchain to process transaction data is performed by running software code contained in the smart contract on the multiple nodes of the blockchain network.

* * * * *

UNITED STATES PATENT AND TRADEMARK OFFICE
CERTIFICATE OF CORRECTION

| | |
|---|---|
| PATENT NO. | : 10,783,590 B1 |
| APPLICATION NO. | : 16/713446 |
| DATED | : September 22, 2020 |
| INVENTOR(S) | : Zhou |

It is certified that error appears in the above-identified patent and that said Letters Patent is hereby corrected as shown below:

In the Claims

Column 17/Line 43 – In Claim 1, delete "aid;" and insert -- aid, --, therefore.

Column 17/Line 47 – In Claim 1, delete "that a at least;" and insert -- that at least --, therefore.

Column 19/Line 31 – In Claim 11, delete "aid;" and insert -- aid, --, therefore.

Column 19/Line 35 – In Claim 11, delete "that a at least;" and insert -- that at least --, therefore.

Column 21/Lines 29-30 – In Claim 21, delete "that a at least;" and insert -- that at least --, therefore.

Signed and Sealed this
Nineteenth Day of April, 2022

Katherine Kelly Vidal
*Director of the United States Patent and Trademark Office*